US006951262B2

(12) United States Patent
West

(10) Patent No.: US 6,951,262 B2
(45) Date of Patent: Oct. 4, 2005

(54) METHOD AND APPARATUS FOR SUPPRESSING WAVES IN A BOREHOLE

(75) Inventor: Phillip B. West, Idaho Falls, ID (US)

(73) Assignee: Battelle Energy Alliance, LLC, Idaho Falls, ID (US)

(*) Notice: Subject to any disclaimer, the term of this patent is extended or adjusted under 35 U.S.C. 154(b) by 0 days.

(21) Appl. No.: 10/099,226

(22) Filed: Mar. 13, 2002

(65) Prior Publication Data

US 2003/0173143 A1 Sep. 18, 2003

Related U.S. Application Data

(60) Provisional application No. 60/362,018, filed on Mar. 5, 2002.

(51) Int. Cl.[7] .................................................. G01V 1/40

(52) U.S. Cl. ....................... 181/105; 181/118; 166/202; 166/206; 367/35; 367/57; 367/86; 367/176; 367/911; 73/152.36; 73/152.32; 73/152.34

(58) Field of Search ................................ 181/101–120; 367/57, 35, 86, 37, 176; 73/155; 166/192, 201, 187, 325, 179

(56) References Cited

U.S. PATENT DOCUMENTS

| | | | | | |
|---|---|---|---|---|---|
| 2,649,711 | A | * | 8/1953 | Dale | 73/152.34 |
| 2,932,740 | A | * | 4/1960 | Widmyer | 250/268 |
| 3,163,038 | A | * | 12/1964 | Bryant | 73/152.34 |
| 3,357,025 | A | * | 12/1967 | Carlton et al. | 346/33 WL |
| 3,473,565 | A | * | 10/1969 | Blendermann | 137/593 |
| 3,623,570 | A | * | 11/1971 | Holloway | 181/118 |
| 4,223,746 | A | * | 9/1980 | Tanguy et al. | 175/40 |
| 4,382,290 | A | * | 5/1983 | Havira | 367/35 |
| 4,441,362 | A | * | 4/1984 | Carlson | 73/152.31 |
| 4,497,388 | A | * | 2/1985 | Dexter | 181/233 |
| 4,576,042 | A | * | 3/1986 | Johnson | 73/152.36 |
| 4,581,927 | A | * | 4/1986 | Johnson | 73/152.36 |
| 4,671,379 | A | * | 6/1987 | Kennedy et al. | 181/106 |
| 4,676,310 | A | * | 6/1987 | Scherbatskoy et al. | 340/853.4 |
| 4,858,718 | A | * | 8/1989 | Chelminski | 181/106 |
| 4,899,320 | A | * | 2/1990 | Hearn et al. | 367/35 |
| 5,005,666 | A | | 4/1991 | Fairborn | 181/102 |
| 5,063,542 | A | * | 11/1991 | Petermann et al. | 367/166 |
| 5,109,946 | A | | 5/1992 | Sorrells | 181/106 |
| 5,174,392 | A | * | 12/1992 | Reinhardt | 175/107 |
| 5,404,946 | A | * | 4/1995 | Hess | 166/187 |
| 5,646,379 | A | * | 7/1997 | Hsu et al. | 181/101 |
| 5,868,168 | A | * | 2/1999 | Mott et al. | 138/31 |
| 6,089,345 | A | | 7/2000 | Meynier et al. | 181/102 |
| 6,119,775 | A | * | 9/2000 | Drechsler et al. | 166/187 |
| 6,181,642 | B1 | * | 1/2001 | Coates et al. | 367/25 |
| 6,196,350 | B1 | | 3/2001 | Minto | 181/106 |
| 6,601,671 | B1 | * | 8/2003 | Zhao et al. | 181/108 |

* cited by examiner

*Primary Examiner*—David Martin
*Assistant Examiner*—Renata McCloud
(74) *Attorney, Agent, or Firm*—Trask Britt, PC

(57) ABSTRACT

Methods and apparatus for suppression of wave energy within a fluid-filled borehole using a low pressure acoustic barrier. In one embodiment, a flexible diaphragm type device is configured as an open bottomed tubular structure for disposition in a borehole to be filled with a gas to create a barrier to wave energy, including tube waves. In another embodiment, an expandable umbrella type device is used to define a chamber in which a gas is disposed. In yet another embodiment, a reverse acting bladder type device is suspended in the borehole. Due to its reverse acting properties, the bladder expands when internal pressure is reduced, and the reverse acting bladder device extends across the borehole to provide a low pressure wave energy barrier.

50 Claims, 6 Drawing Sheets

METHOD AND APPARATUS FOR SUPPRESSING WAVES IN A BOREHOLE

CROSS-REFERENCE TO RELATED APPLICATIONS

This application claims the benefit of U.S. Provisional Application filed Mar. 5, 2002, Ser. No. 60/362,018 entitled METHOD AND APPARATUS FOR SUPPRESSING WAVES IN A BOREHOLE, which is incorporated herein by reference in its entirety.

GOVERNMENT RIGHTS

The United States Government has certain rights in this invention pursuant to Contract No. DE-AC07-99ID13727, and Contract No. DE-AC07-05ID14517 between the United States Department of Energy and Battelle Energy Alliance, LLC.

FIELD OF THE INVENTION

The present invention relates generally to seismic surveying of geological formations as conducted, by way of example only, in oil and gas exploration. More particularly, the present invention relates to improving seismic data collection within a well borehole by suppressing undesired acoustic waves generated therein by a seismic source.

STATE OF THE ART

Seismic surveying is used to examine subterranean geological formations for the potential presence of hydrocarbons such as oil, natural gas and combinations thereof as well as the extent or volume of such reserves. Wave energy, sonic energy, or pressure waves, also termed seismic waves, are emitted from a source to penetrate through layers of rock and earth, and under certain conditions are reflected and refracted by variations in the composition of the subterranean formations in the path of the waves. Microphone-like sensors receive the reflected and refracted energy waves and convert them into corresponding electrical signals which are then analyzed for the presence and extent of formations containing oil and gas deposits.

One technique that has shown great promise for underground exploration is known as borehole seismic surveying, wherein a source for emitting energy waves is placed deep underground in a fluid-filled borehole. By so placing the wave energy source in close proximity to an area of interest, reflected signal strength is increased and new depths and orientations are observed and recorded thus providing new and different views of subterranean formations not obtainable with surface-based seismic techniques, that can be explored to locate hydrocarbon reserves that might otherwise remain hidden. Receiving sensors are also located below the ground surface, such as in the same or other boreholes. Placing both the wave energy source and the sensors within the same borehole, thus requiring the drilling or occupying of only one well, is particularly attractive. However, a problem that occurs, especially with a single well type survey system, is that wave energy from the wave energy source emanates in all directions, not only outwardly into the formation of interest but also up and down the borehole. This up and down-directed wave energy can result in so-called "tube waves" that propagate through the fluid within the borehole. Such tube waves, also known as "Stonely waves", as well as other types of waves that may be present in the borehole, interfere with the ability of the sensors to receive the energy waves reflected from the surrounding formations and thus provide accurate survey information for processing.

Attempts have been made to reduce this type of interference with devices to suppress tube wave propagation in the borehole or to isolate the receiving sensors using barriers for reflecting or attenuating the tube waves. U.S. Pat. No. 5,005,666 to Fairborn, for example, discloses using gas-inflatable bladders placed into a borehole above and below a seismic receiver to acoustically isolate the seismic receiver from tube waves. These bladders present problems, however, in that gas-inflatable bladders by their nature require the gas they contain to be of a sufficient pressure and density to overcome borehole fluid pressure, thus reducing the ability to suppress sound waves. Further, the use of gas necessitates complex and costly associated hardware. U.S. Pat. No. 6,089,345 to Meynier et al. discloses another exemplary technique, wherein gas bubbles are dispersed within a borehole to attenuate tube waves. This design also requires complex hardware in the form of a self-contained bubble generator or conduit associated with the downhole seismic equipment, and presents difficulties with pressure variations in the borehole due to escaping bubbles.

Accordingly, a need exists for improved methods and apparatus of simple and durable construction and reliable operation for efficiently suppressing tube waves other waves in a borehole.

BRIEF SUMMARY OF THE INVENTION

The present invention provides methods and apparatus for suppressing waves such as tube waves to significantly reduce or eliminate interference experienced by sensors disposed in a borehole for collecting data in the form of energy waves emitted from a wave energy source and reflected and refracted from surrounding formations. Embodiments of the present invention are directed to reducing or eliminating this type of interference by isolating the sensors from the tube waves in the borehole in which the sensors are disposed. A relatively low differential pressure gas in the form of an enclosed gas volume extending substantially across the cross-section of the borehole is used as an attenuation barrier for tube wave suppression. Thus, a "soft" acoustical energy sink is used to absorb pressure disturbances.

In one exemplary embodiment of the invention, a method and apparatus are provided for suppressing tube waves in a fluid-filled borehole using a flexible diaphragm type device is suspended in the borehole to trap a volume of gas therebelow to create an acoustic energy sink for reducing transmission of the tube waves. The device is configured as an open bottomed tubular structure that, once deployed, is simply filled from underneath with gas from a supply source. The top of the tubular structure is closed with a flexible diaphragm comprising a membrane of elastomeric material so as to better absorb acoustical pressure disturbances encountered by the tube waves. The sides of the tubular structure may be flexible as well, or may be of rigid construction.

In another exemplary embodiment of the invention, a method and apparatus for suppressing tube waves in a fluid-filled borehole involve the use of an expandable, umbrella type device to trap a volume of gas underneath and create an acoustic energy sink. The umbrella type device is constructed of rods having a flexible material such as a gas-impermeable fabric attached thereto and extending therebetween. The device is positioned within the borehole in a collapsed state, and a source of gas is then used to expand the device to open the device and form a conical shape for retaining the gas underneath. The device may be held in its collapsed state by an inverted cup containing the free ends of the rods, and released by pneumatically pushing down the cup using gas from a gas source to fill the device.

In yet another exemplary embodiment of the invention, a method and apparatus are provided for suppressing tube waves in a borehole wherein a reverse acting bladder type device suspended in the borehole blocks the borehole with a contained area of low pressure fluid (gas) that acts as a wave energy sink. The device operates by presenting a reduced diameter and extended length when internally pressurized, and expands to an increased diameter and reduced length when the pressurizing fluid is evacuated therefrom. The device is deployed in its pressurized, narrow, relatively elongated state and, once in place, internal pressure is reduced to ambient borehole pressure or below to cause it to expand and reach substantially across the borehole.

Other and further features and advantages will be apparent from the following descriptions of the various embodiments of the invention read in conjunction with the accompanying drawings. It will be understood by one of ordinary skill in the art that the following are provided for illustrative and exemplary purposes only, and that numerous combinations of the elements of the various embodiments of the present invention are possible.

BRIEF DESCRIPTION OF THE SEVERAL VIEWS OF THE DRAWINGS

In the drawings, which illustrate what is currently considered to be the best mode for carrying out the invention.

DETAILED DESCRIPTION OF THE INVENTION

Figure 1:
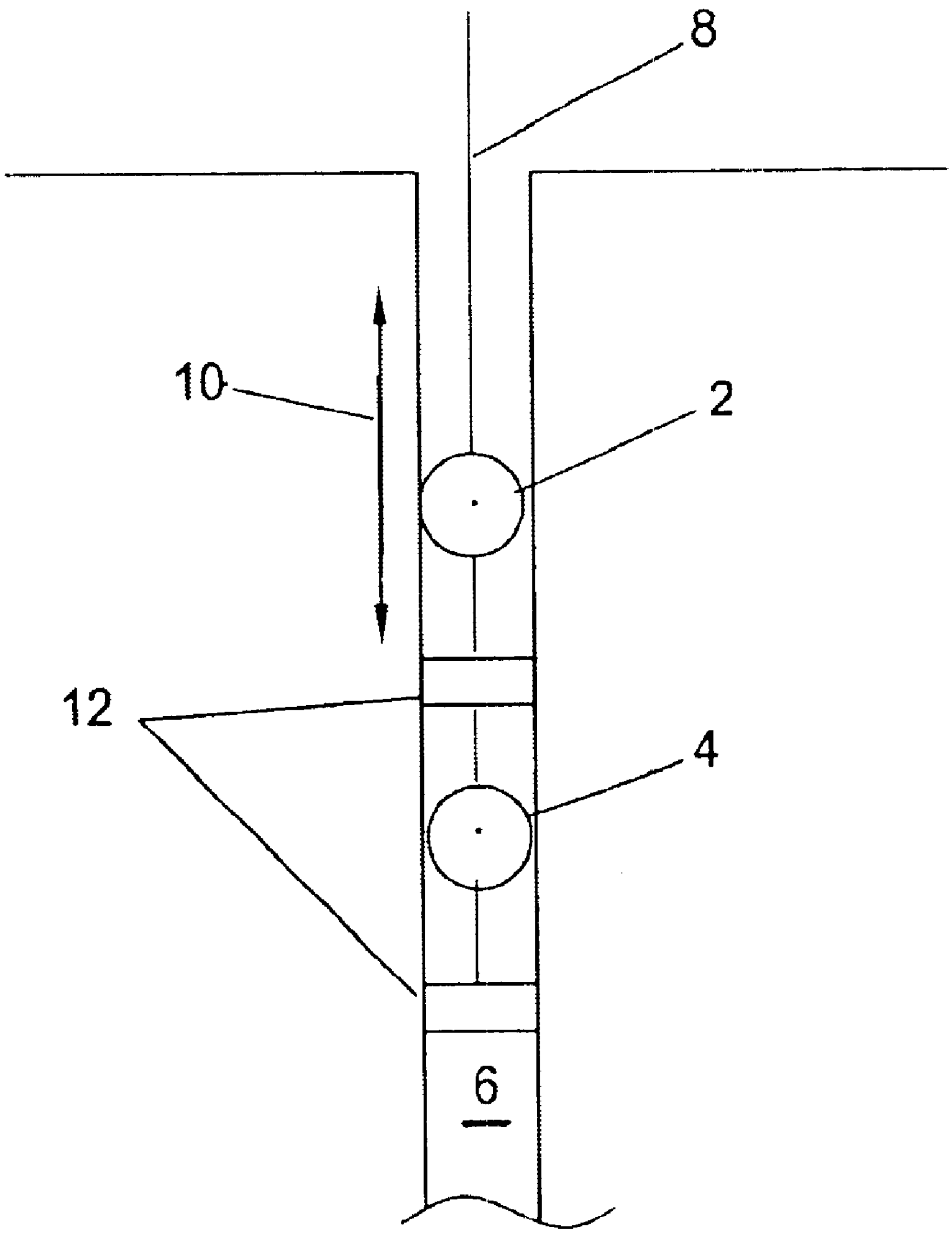
FIG. 1 is a side view of a borehole seismic survey location of the single well type in which a seismic energy source, receiving sensor and tube wave suppression devices are deployed within a borehole.

FIG. 1 is a schematic of a seismic survey location wherein a seismic, or wave energy, source 2 and at least one receiving sensor 4 are lowered into a liquid or slurry-filled borehole 6 on a wireline 8 or other suitable structure, such as a tubing string. The liquid or slurry may comprise, for example, water or a water or hydrocarbon-based drilling fluid, or "mud." The at least one sensor 4 may be configured as a hydrophone, as known in the art. Seismic signals in the form of energy, pressure, sound or acoustic waves generated by source 2 will propagate through the subterranean formations surrounding the borehole and sensor 4 is used to monitor reflected and refracted signals returning from these formations to provide information about geological features thereof. Because the seismic signals emitted by seismic energy source 2 emanate in all directions therefrom, tube waves that travel up and down the fluid column within the borehole 6 as indicated by directional arrows 10 are generated. These tube waves interfere with the detection of the reflected and refracted seismic signals by the sensor 4, thus reducing the quality of the survey information.

One solution to this problem is to include wave suppression devices 12 within the borehole to attenuate or impede the transmission of tube waves to the location of the at least one sensor 4. As indicated in FIG. 1, the wave suppression devices 12 may be positioned along wireline 8 so as to isolate the at least one sensor 4 from interference by acting as barriers to tube wave propagation along the length of the borehole. As illustrated, it may be desirable to dispose at least one wave suppression device between seismic source 2 and the at least one sensor 4. Of course, this approach is not limited to the exemplary component arrangement provided in FIG. 1, but may be used with different layouts for the borehole components, including using the use of multiple seismic sources or sensors.

Figure 2:
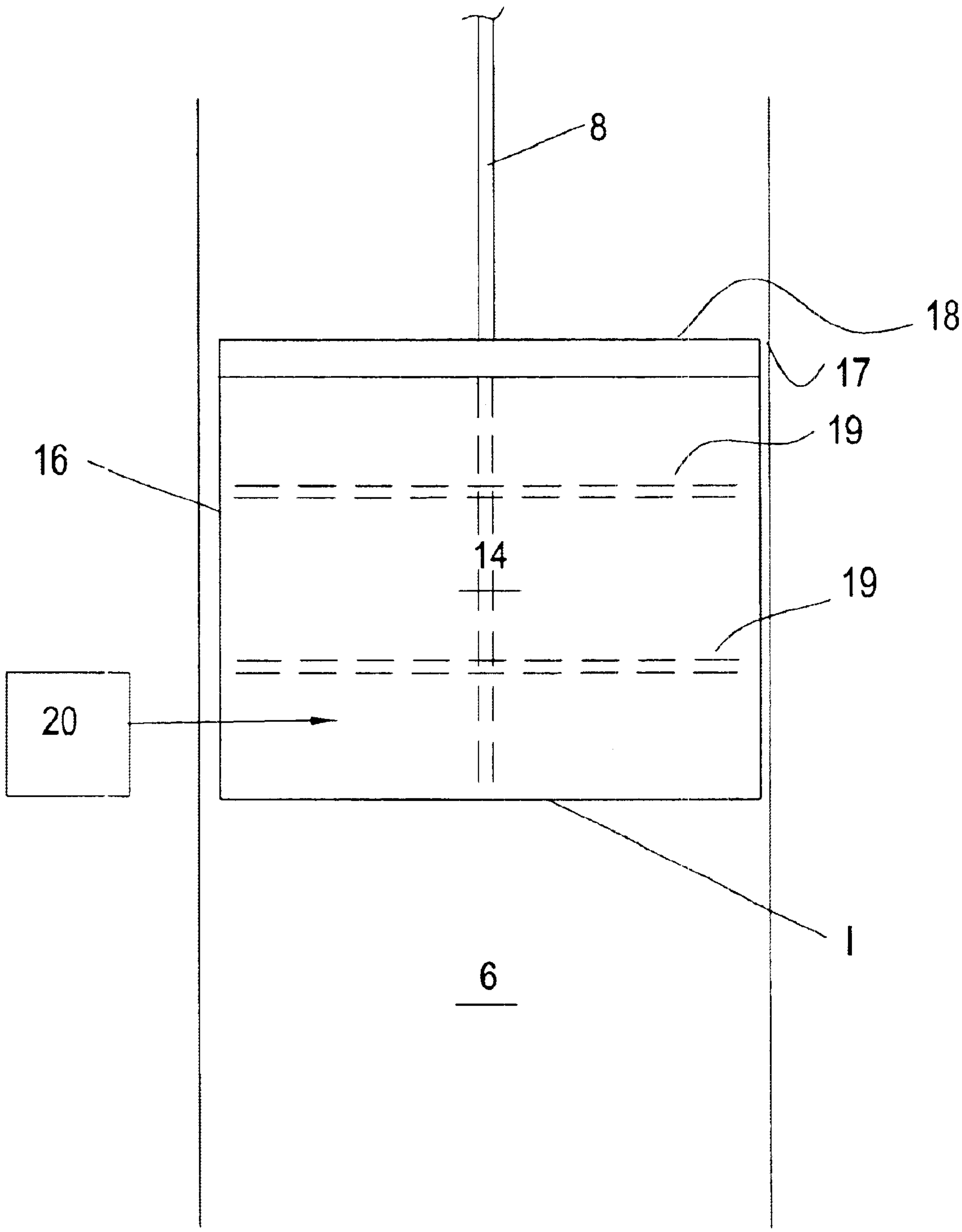
FIG. 2 is a schematic view of a flexible diaphragm type wave suppression device having an open bottomed tubular structure.

FIG. 2 illustrates a flexible diaphragm type wave suppression device 14 used in one embodiment of the present invention and located as described with respect to FIG. 1. Diaphragm type wave suppression device 14 may be configured in the form of an open bottomed tubular structure 16 having a diaphragm 18 formed of a relatively soft and pliable, flexible membrane of elastomeric material and suspended from a hoop-like frame 17 covering its top. The open bottomed tubular structure 16 may be fabricated of a rigid material such as metal or PVC, but may also be formed of an elastomeric or other flexible material, such as the material used for the membrane. One or more of the diaphragm type wave suppression devices 14 may be positioned along wireline 8 at locations adjacent and, for example, bracketing the at least one sensor 4, and the assembly lowered into a borehole. The diameter of the tubular structure 16 may be of a size sufficient to extend across substantially an entire width of the borehole, while still allowing it to freely move along the borehole interior through the fluid column present in the borehole.

Once the diaphragm type wave suppression device 14 is in place, the tubular structure 16 of the device is simply filled from underneath by a gas source 20 to substantially the full height of tubular structure 16. Gas source 20 may be supplied to the borehole through a conduit extending from a surface location, or may be supplied from a self-contained source lowered into the borehole with the rest of the assembly. In the latter instance, the gas may be generated through a chemical reaction, or a compressed or liquefied form of the gas may be allowed to expand from a vessel. A volume of gas is thus trapped within tubular structure 16 below diaphragm 18. Accordingly, proximate the bottom of tubular structure 16, the gas will have a direct interface I with the borehole fluid. This interface I presents a low impedance surface of poor acoustical transmissibility that attenuates or otherwise suppresses tube waves traveling up and down the borehole. In addition, because diaphragm 18 is constructed of a flexible membrane of elastomeric material, it acts to further absorb acoustic energy and minimize any reflection of tube waves back along the length of the borehole.

The embodiment of FIG. 2 is believed to be effective in suppressing tube waves encountered from either the open bottomed side or the top diaphragm side of the device. Therefore, improved suppression is realized for tube waves traveling in either direction, and whether wave suppression device 14 is located above or below source and sensor elements. Because wave suppression device 14 is open bottomed it does not require complex inflation and gas retention and bleed hardware, as in the case of the previously referenced bladder systems. The trapped gas will be at a pressure substantially equal to that of the ambient borehole pressure, and will reduce sound energy transmission by nature of being more compressive than the borehole fluid. A low compressive spring rate exhibited by the gas-filled structure 16 and easily-displaced, soft diaphragm 18 further optimizes sound absorbing capability. Various types of compressible gases, including air, would be suitable for gas source 20, but a light (low density) gas such as helium or nitrogen may improve its potential even further. It is also contemplated that one or more baffles 19 may be placed below diaphragm 18 within the gas filled cavity for additional energy adsorption.

Figure 3A:
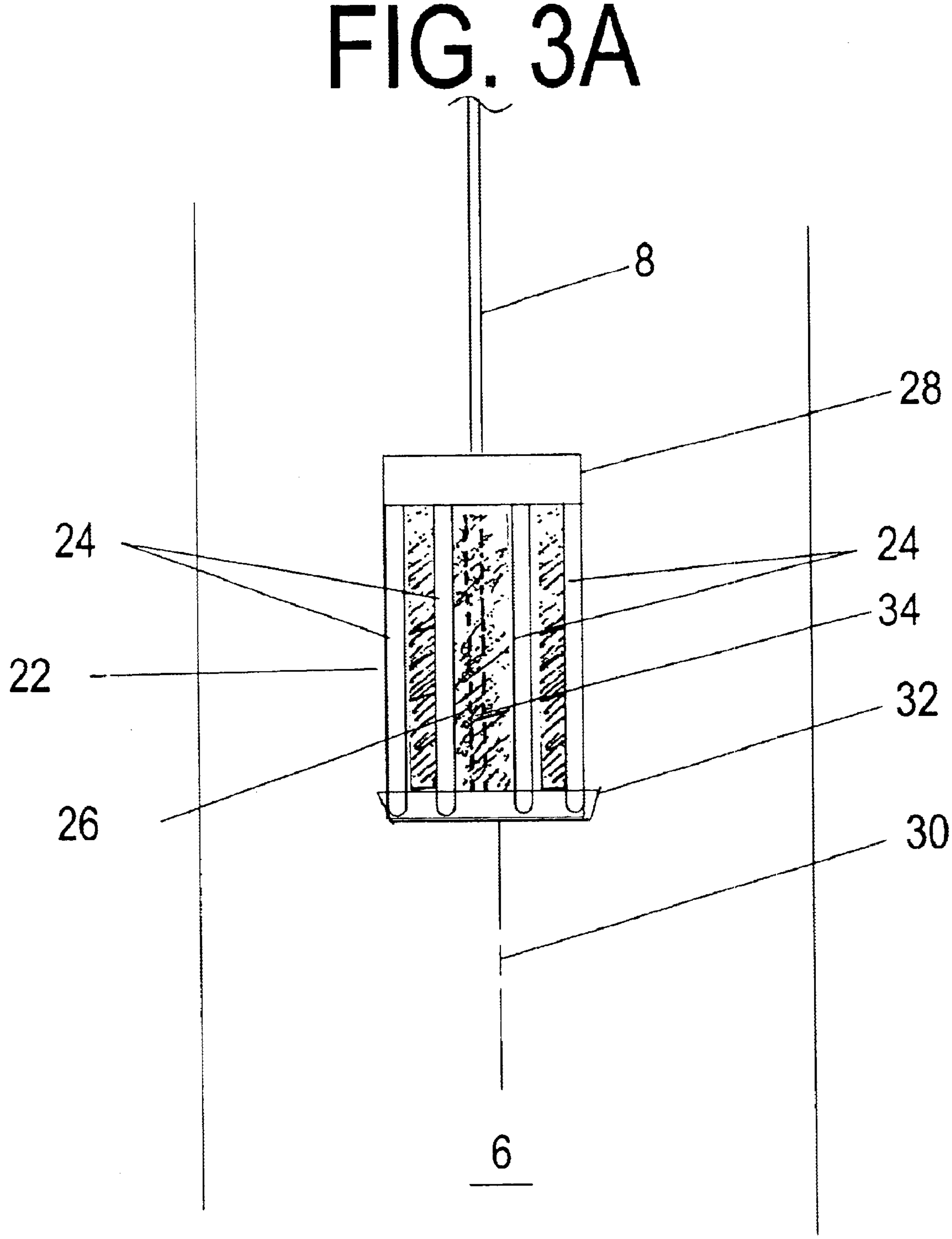
FIG. 3A is a schematic view of an expandable umbrella type wave suppression device in its collapsed state for lowering into or removing from a borehole.
Figure 3B:
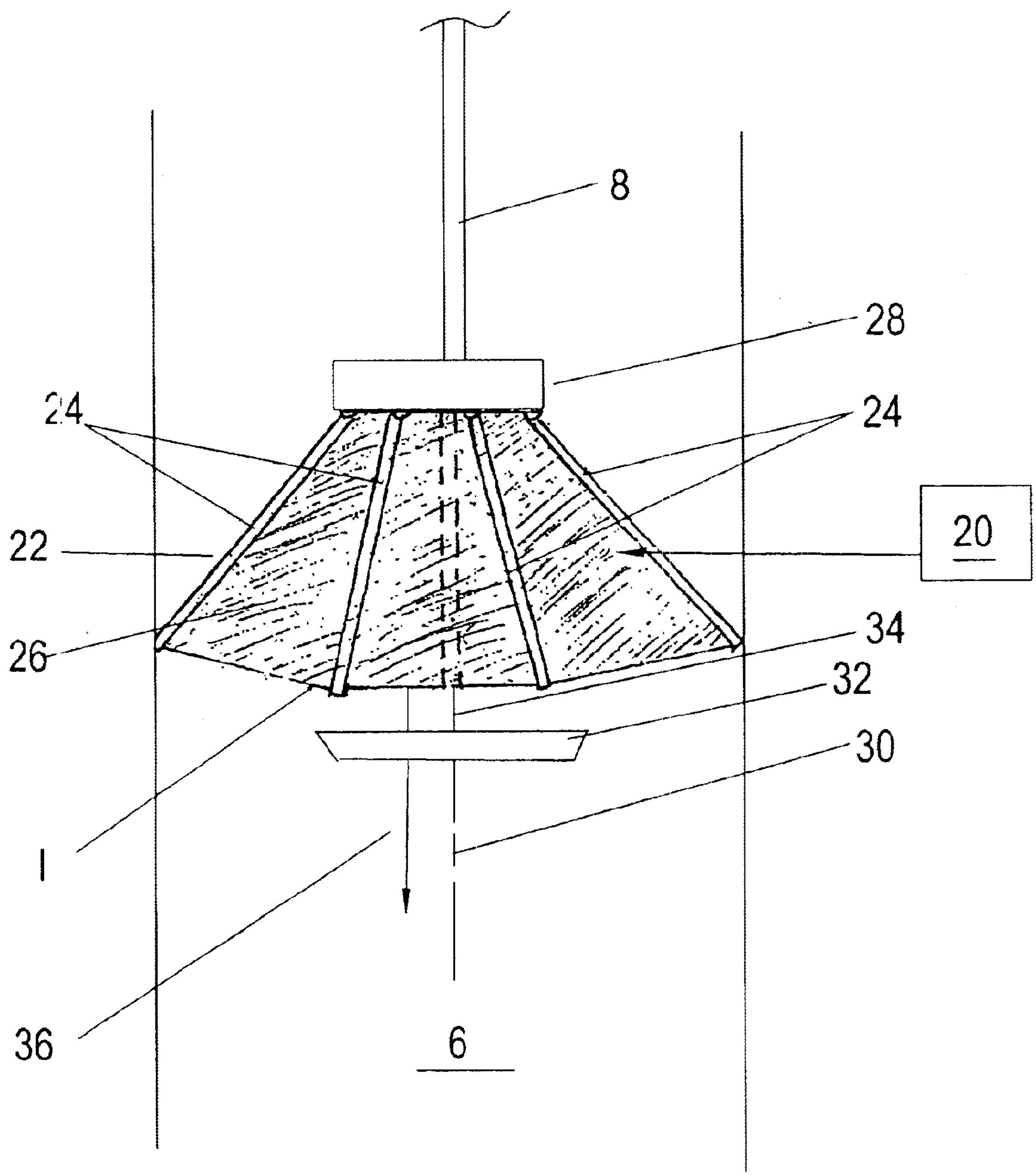
FIG. 3B is a schematic view of an expandable umbrella type wave suppression device as deployed in a borehole in its expanded state.

Turning to FIGS. 3A and 3B, an expandable umbrella type wave suppression device 22 is illustrated as another embodiment of the present invention. The umbrella type wave suppression device 22 comprises a number of rods 24 attached to a web of gas impermeable fabric 26 and pivotally connected at one end to a base 28. Rods may be formed of metal, fiberglass, a carbon fiber composite, or other suitable material. Gas impermeable fabric 26 may comprise, for example, a vinyl or other polymer having reinforcing elements such as woven fibers or threads therein. When pivoted away from the central axis line 30 substantially coincident with wireline 8, rods 24 unfold and expand flexible material 26 in a manner similar to that of opening an umbrella to form a conical chamber or canopy for retaining a volume of gas thereunder. In use, umbrella type wave suppression device 22 operates to suppress tube waves in much the same fashion as diaphragm type wave suppression device 14. As with diaphragm type wave suppression device 14, umbrella device 22 is lowered into a borehole a wireline 8 or other structure, such as a tubing string. Once in place, gas source 20 is used to fill the interior chamber of umbrella device 22 defined under the expanded web of gas impermeable fabric 26, the trapped gas expanding the web into a conical form and substantially filling the cross section of the borehole. Again, gas source 20 may be provided from a surface location, or may be a self-contained source near or integral with umbrella type wave suppression device 22. In the same way as described above, the gas trapped by umbrella type wave suppression device 22 has a direct interface I with the borehole fluid therebelow and creates an impedance to acoustical transmission up and down the borehole to suppress tube waves. The displacement of flexible material 26 when an acoustic wave encounters umbrella type wave suppression device 22 further assists in absorbing acoustic energy, as with diaphragm 18 of diaphragm type wave suppression device 14.

Aside from operating at substantially ambient borehole pressure like diaphragm type wave suppresion device 14, umbrella type wave suppression device 22 has the added benefit of being expandable and collapsible. This design allows for easy deployment into and withdrawal from a borehole due to its slender configuration when collapsed. The design also permits use within widely varying borehole diameters while ensuring a close fit therein when expanded.

As seen in FIG. 3A, when being tripped, or lowered, into or tripped, or raised, out of borehole 6 via a wireline 8, the umbrella type device wave suppression device 22 is in a collapsed state wherein rods 24 are in a closed position adjacent central axis 30. Rods 24 may be maintained in the closed position by a holding element. FIG. 3A, for example, shows a holding element in the form of an inverted cup 32 placed on a central shaft 34 extending from the bottom end of the umbrella to entrain the free ends of rods 24. Of course, this is only one example, and it is understood that other holding means known in the art could also be used. For example, a frangible band of a predetermined strength to break when gas is introduced under the web of gas impermeable fabric 26 may be placed around rods 24. Alternatively, rods 24 may be spring-loaded or otherwise biased toward the closed position. While in the collapsed state, umbrella type wave suppression device 22 presents a reduced radius configuration provides less resistance to borehole fluid during travel through the borehole and is also less likely to snag on the wall of a borehole. Accordingly, the tripping, or lowering while unexpanded and raising while either expanded e unexpanded, of umbrella type wave suppression device 22 within a borehole are simplified.

Referring to FIG. 3B, when umbrella device 22 is at a desired position within a borehole, rods 24 are released, gas is supplied from gas source 20, and the gas impermeable fabric 26 expands outwardly to define the aforementioned conical chamber or canopy. In the case where cup 32 is used as the holding element, cup 32 is moved downwardly in the direction of arrow 36 to release the ends of rods 24 prior to expansion of the web gas impermeable fabric 26. Cup 32 may be slidably mounted on shaft 34 and pushed away from the free ends of rods 24 by gas pressure. Mechanical means such as a spring may also be used to extend or retain cup 32 away from or towards the free ends of rods 24, or the cup may be fixedly mounted on shaft 34 and gas pressure used to fill umbrella device 22 could even provide sufficient force against gas impermeable fabric 26 to bend rods 24 outwardly, thus effectively foreshortening them and releasing their free ends from cup 32. Once released, the trapped gas will tend to push and pivot the free ends of rods 24 out from central axis 30 until they encounter the wall of borehole 6. Thus umbrella type wave suppression device 22 creates an acoustic barrier that will accommodate varying borehole diameters and closely conform to any irregularities around the borehole circumference. Further, the conical shape of expanded wave suppression device 22 allows it to be pulled toward the surface while maintaining gas volume enabling continued wave suppression. Thus, a plurality of seismic tests may be run at different depths, the wireline 8 being used to trip the downhole assembly including the at least one sensor 4 upwardly in the borehole between tests Another exemplary embodiment of the present invention is presented in FIGS. 4A and 4B, wherein a reverse acting bladder type wave suppression device 38 is used for wave suppression in a borehole. The reverse acting bladder type wave suppression device 38 may be constructed of at least one layer of elastomeric material, such as natural or synthetic rubber, shaped in the form of a bellows 40 and enclosing a column of air or gas. Of course, the elastomeric material may be reinforced with fabric, as known in the art. When pressure within reverse acting bladder type wave suppression device 38 is increased, it stretches out bellows 40 in the longitudinal direction as indicated by arrows 42 in FIG. 4A, and reduces the bladder diameter D. When internal pressure of the bladder type wave suppression device 38 is decreased, the device contracts longitudinally and bladder diameter D increases as indicated by arrows 44 in FIG. 4B. Similar mechanisms, sometimes referred to as air springs or linear actuators, have been fabricated for use in other industrial applications and would be suitable for use in the present invention. Bridgestone/Firestone™ Company, for example, offers such mechanisms under the product name Airstroke™ actuators.

Figure 4A:
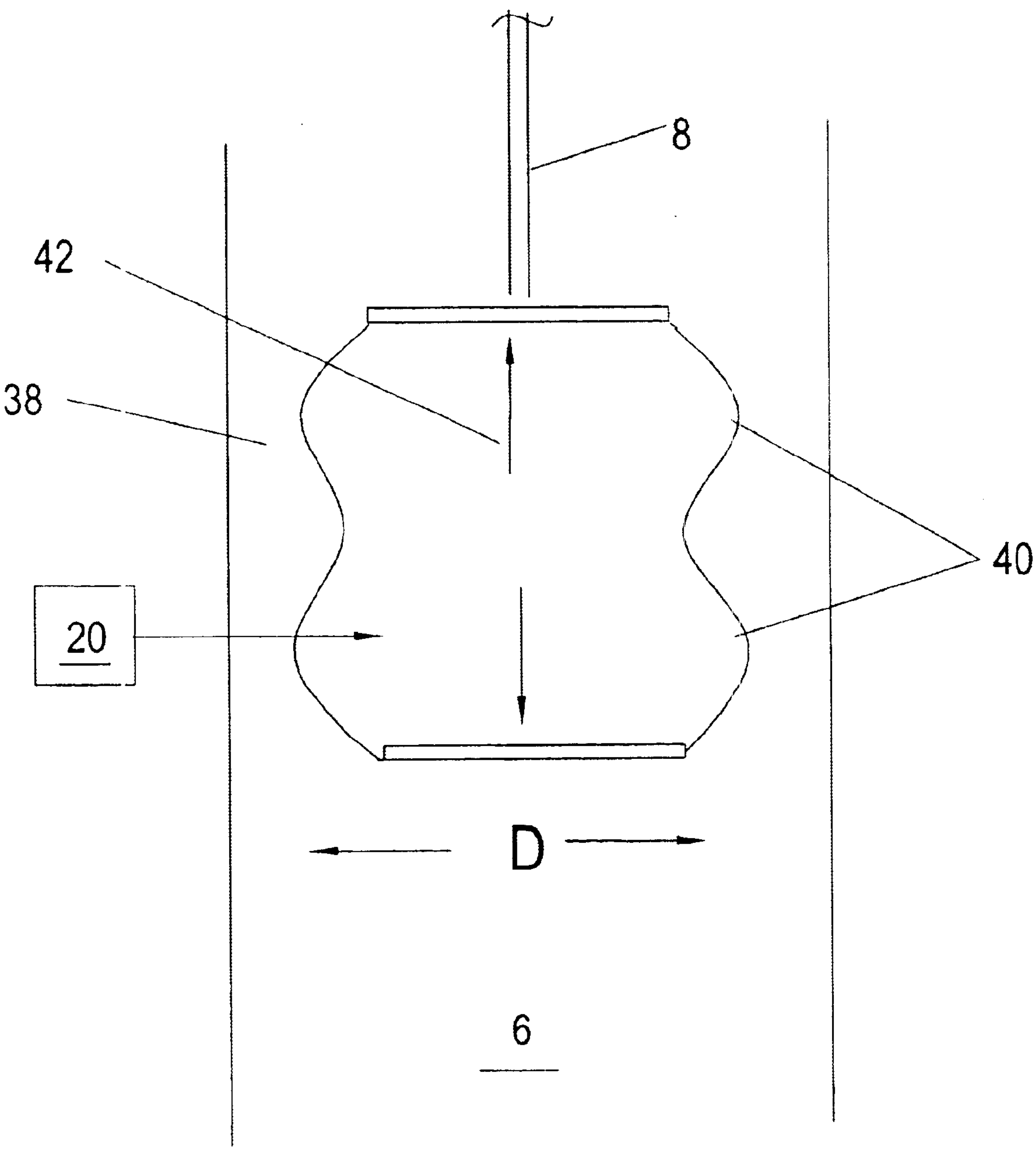
FIG. 4A is a schematic view of a reverse acting bladder type wave suppression device having a reduced diameter and extended length due to internal pressurization while lowering into or removing from a borehole.

In operation, reverse acting bladder type wave suppression device 38 is pressurized by a gas source 20 through to maintain a reduced diameter D during borehole insertion and withdrawa,l as depicted in FIG. 4A. In a manner similar to that of umbrella type wave suppression device 22, the ability to reduce the diameter of the device facilitates longitudinal movement of reverse acting bladder type wave suppression device 38 up and down the fluid column of borehole 6. Bladder pressurization may be achieved using air or other gases, supplied from above or below surface, but would preferably use a light, low density gas such a helium or nitrogen for the reasons previously stated.

Figure 4B:
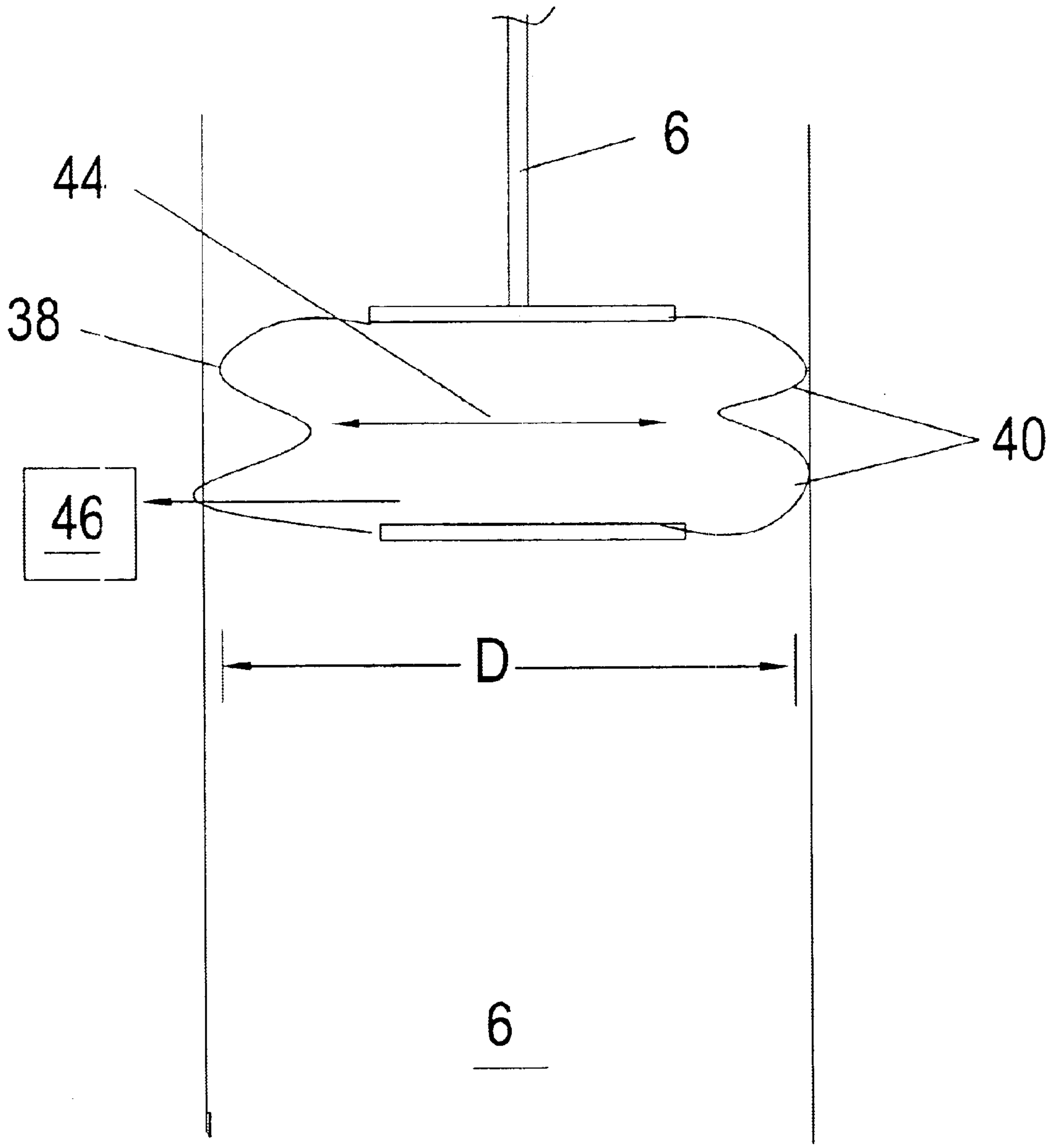
FIG. 4B is a schematic view of a reverse acting bladder type wave suppression device having an increased diameter and reduced length due to an internal relative vacuum generated during deployment in a borehole.

FIG. 4B shows that once in place, gas source 20 may be deactuated or disconnected and gas released from the interior of reverse acting bladder type wave suppression device 38 to reduce interior pressure thereof. A remotely actuated bleed valve may be used to release the gas. As a result, bellows 40 contracts, and diameter D increases to substantially seal off borehole 6 with an acoustic barrier for suppressing tube waves. If desired, a pump 46 may be utilized for further reducing the internal bladder pressure below that of the ambient borehole pressure to create a relative vacuum within reverse acting bladder device 38 and further expand bellows 40.

Because this reverse acting bladder type wave suppression device 38 expands by reducing internal pressure, rather than increasing it as in the inflatable diaphragm and umbrella-type embodiments described above, it may provide an improved operating capability. The zone of reduced pressure gas contained within the bladder is less dense than in bladders inflated for use in wave suppression, and will therefore provide relatively enhanced tube wave suppression. Further, since the reverse acting bladder design uses gas pressure above ambient borehole pressure only during positioning and not during wave suppression, there is no concern about undue gas density resulting from high inflation pressures, and the bladder may consequently be of a more durable construction. In addition to less complexity of hardware, more durable construction and smaller, easier to use components, the use of deflation rather than inflation to expand the bladder laterally results in lower gas requirements.

All of the above illustrated embodiments of the present invention provide improved tube wave suppression as described, as well as the additional benefits of simple and straightforward, cost-effective construction and operation. Thus, more cost effective and productive seismic surveying are enabled. Although the present invention has been depicted and described with respect to the illustrated embodiments, various additions, deletions and modifications are contemplated without departing from its scope or essential characteristics. Furthermore, while described in the context of oil and gas exploration, the invention has utility in other types geological exploration, subterranean mining and even subterranean rescue and recovery operations necessitated by mine disasters. The scope of the invention is, therefore, indicated by the appended claims rather than the foregoing description. All changes which come within the meaning and range of equivalency of the claims are to be embraced within their scope.

I claim:

1. An apparatus for suppressing wave energy in a borehole comprising:

a wave suppression structure having a closed top end comprising a flexible membrane and an open bottom end and defining a chamber under the top end, wherein the wave suppression structure comprises a substantially tubular structure formed of a flexible material;

a structure connected to the wave suppression structure for use in lowering and raising the wave suppression structure within the borehole; and a gas source for supplying gas to the chamber of the wave suppression structure.

2. The apparatus according to claim 1, wherein a diameter of the wave suppression structure is sized to extend substantially across a diameter of the borehole in which the apparatus is to be disposed.

3. The apparatus according to claim 1, wherein the structure for lowering and raising the wave suppression structure within the borehole is a wireline or a tubing string.

4. The apparatus according to claim 1, wherein the substantially tubular structure is formed of an elastomeric material.

5. The apparatus according to claim 4, wherein the closed top end of the wave suppression structure comprises a membrane formed of the same elastomeric material as the substantially tubular structure.

6. An apparatus for suppressing wave energy in a borehole comprising:

a wave suppression structure having a closed top end and an open bottom end defining a chamber under the top end;

a structure connected to the wave suppression structure for use in lowering and raising the wave suppression structure within the borehole;

a gas source for supplying gas to the chamber of the wave suppression structure; and at least one baffle within the chamber of the wave suppression structure.

7. An apparatus for suppressing wave energy in a borehole comprising:

a wave suppression structure having a closed top end and an open bottom end and defining a chamber under the top end, wherein the wave suppression structure comprises a substantially tubular structure formed of a flexible material;

a structure connected to the wave suppression structure for use in lowering and raising the wave suppression structure within the borehole; and a gas source for supplying gas to the chamber of the wave suppression structure, wherein the gas source is a self-contained gas source associated with the apparatus.

8. An apparatus for suppressing wave energy in a borehole comprising:

a wave suppression structure having a closed top end and an open bottom end and defining a chamber under the top end, wherein the wave suppression structure comprises a substantially tubular structure formed of a flexible material;

a structure connected to the wave suppression structure for use in lowering and raising the wave suppression structure within the borehole; and a gas source for supplying gas to the chamber of the wave suppression structure, wherein the gas is helium or nitrogen.

9. An apparatus for suppressing wave energy in a borehole comprising:

a wave suppression structure having a closed top end and an open bottom end and defining a chamber under the top end, wherein the wave suppression structure comprises a substantially tubular structure formed of a flexible material;

a structure connected to the wave suppression structure for use in lowering and raising the wave suppression structure within the borehole;

a gas source for supplying gas to the chamber of the wave suppression structure; and at least one sensor connected to the structure for use in lowering and raising the wave suppression structure within the borehole.

10. A method of suppressing wave energy in a borehole comprising:

positioning a wave suppression structure within a fluid-filled borehole, including configuring the wave suppression structure to comprise a substantially tubular structure formed of a flexible material, the wave suppression structure having a closed top end comprising a flexible membrane defining a diaphragm and an open bottom end and defining a chamber below the closed top end;

supplying gas to the chamber;

retaining a volume of the gas at substantially an ambient pressure of fluid within the fluid-filled borehole underneath the closed end of the wave suppression structure; and suppressing the transmission of wave energy traveling along the fluid-filled borehole with the volume of gas, including absorbing wave energy with the flexible membrane.

11. The method according to claim 10, wherein positioning the wave suppression structure within the fluid-filled borehole comprises raising and lowering the wave suppression structure.

12. The method according to claim 10, further comprising forming the substantially tubular structure from an elastomeric material.

13. The method according to claim 12, further comprising forming the closed top end of the wave suppression structure from the same elastomeric material as the substantially tubular structure.

14. A method of suppressing wave energy in a borehole comprising:

positioning a wave suppression structure within a fluid-filled borehole, including configuring the wave suppression structure to have a closed top end and an open bottom end and defining a chamber below the closed top end with at least one baffle disposed within the chamber;

supplying gas to the chamber;

retaining a volume of the gas at substantially an ambient pressure of fluid within the fluid-filled borehole underneath the closed end of the wave suppression structure; and suppressing the transmission of wave energy traveling along the fluid-filled borehole with the volume of gas and the at least one baffle.

15. The method according to claim 14, wherein positioning the wave suppression structure within the fluid-filled borehole comprises raising and lowering the wave suppression structure.

16. The method according to claim 14, wherein supplying the gas to the chamber comprises supplying the gas from a gas source located within the fluid-filled borehole.

17. The method according to claim 14, wherein supplying the gas comprises supplying helium or nitrogen.

18. The method according to claim 14, further comprising: positioning a sensor and a wave energy source within the fluid-filled borehole; and positioning the wave suppression structure adjacent the sensor.

19. A method of suppressing wave energy in a borehole comprising:

positioning a wave suppression structure within a fluid-filled borehole, including configuring the wave suppression structure to comprise a substantially tubular structure formed of a flexible material, the wave suppression structure having a closed top end and an open bottom end and defining a chamber below the closed top end;

wherein supplying the gas to the chamber comprises supplying the gas from a gas source located within the fluid-filled borehole;

supplying gas to the chamber;

retaining a volume of gas at substantially an ambient pressure of fluid within the fluid-filled borehole underneath the closed end of the wave suppression structure; and suppressing the transmission of wave energy traveling along the fluid-filled borehole with the volume of gas.

20. A method of suppressing wave energy in a borehole comprising:

positioning a wave suppression structure within a fluid-filled borehole, including configuring the wave suppression structure to comprise a substantially tubular structure formed of a flexible material, the wave suppression structure having a closed top end and an open bottom end and defining a chamber below the closed top end;

supplying gas to the chamber, wherein supplying the gas comprises supplying helium or nitrogen;

retaining a volume of the gas at substantially an ambient pressure of fluid within the fluid-filled borehole underneath the closed end of the wave suppression structure; and suppressing the transmission of wave energy traveling along the fluid-filled borehole with the volume of gas.

21. A method of suppressing wave energy in a borehole comprising:

positioning a wave suppression structure within a fluid-filled borehole, including configuring the wave suppression structure to comprise a substantially tubular structure formed of a flexible material, the wave suppression structure having a closed top end and an open bottom end and defining a chamber below the closed top end;

supplying gas to the chamber;

retaining a volume of the gas at substantially an ambient pressure of fluid within the fluid-filled borehole underneath the closed end of the wave suppression structure;

positioning a sensor and a wave energy source within said fluid-filled borehole;

positioning the wave suppression structure adjacent the sensor; and suppressing the transmission of wave energy traveling along the fluid-filled borehole with the volume of gas.

22. An apparatus for suppressing wave energy in a borehole comprising:

a wave suppression structure comprising:

a plurality of rods pivotally connected about a common base and, in a first position, extending substantially parallel to a longitudinal axis extending downwardly from the base; and a web of gas-impermeable flexible material attached to the plurality of rods and defining a conical chamber when the plurality of rods are pivoted away from the vertical axis;

a structure for lowering and raising the wave suppression structure within the borehole; and a gas source for supplying gas to the chamber of the wave suppression structure.

23. An apparatus according to claim 22, further comprising:

a holding element for holding the plurality of rods in the first position.

24. The apparatus according to claim 23, wherein the holding element is suspended from a shaft mounted to the base and extending to a location proximate a plurality of free ends of the plurality of rods, respectively and the holding element further comprises:

an inverted cup attached to the shaft and extending over the plurality of free ends of the plurality of rods, the inverted cup being movably mounted in relation to the base so as to release the plurality of free ends of the plurality of rods, respectively, when moved away from the base.

25. The apparatus according to claim 22, wherein the structure for lowering and raising the wave suppression structure within the borehole is a wireline or a tubing string.

26. The apparatus according to claim 22, herein the gas source is a self-contained gas source associated with the apparatus.

27. The apparatus according to claim 22, wherein the gas is helium or nitrogen.

28. The apparatus according to claim 22, further comprising: at least one sensor connected to the structure.

29. The apparatus according to claim 22, wherein the web of gas-impermeable flexible material comprises a fabric.

30. A method of suppressing wave energy in a borehole comprising:

positioning a wave suppression structure including a plurality of rods pivotally connected about a base and a web of gas-impermeable flexible material attached to each of the plurality of rods within a fluid-filled borehole;

supplying a gas to the wave suppression structure below the web to rotate each of the plurality of rods upwardly and expand the web of gas-impermeable flexible material into the shape of a conical chamber;

retaining a volume of the gas within the conical chamber; and suppressing the transmission of wave energy traveling along the fluid-filled borehole with the volume of gas.

31. The method according to claim 30, further comprising:

holding a plurality of free ends of the plurality of rods, respectively, in mutually adjacent locations during the positioning of the wave suppression structure; and releasing the plurality of free ends of the plurality of rods while supplying the gas to the wave suppression structure.

32. The method according to claim 31, further comprising holding the free ends of the plurality of rods in mutually adjacent locations using an inverted cup and moving the inverted cup away from the plurality of free ends of the plurality of rods to release the plurality of free ends.

33. The method according to claim 30, wherein positioning the wave suppression structure within the borehole comprises raising and lowering the wave suppression structure.

34. The method according to claim 30, wherein supplying the gas comprises supplying the gas from a gas source located within the borehole.

35. The method according to claim 30, wherein supplying the gas comprises supplying helium or nitrogen.

36. The method according to claim 30, further comprising:

positioning at least one sensor within the fluid-filled borehole; and positioning the wave suppression structure adjacent the at least one sensor.

37. An apparatus for suppressing wave energy in a borehole comprising:

a wave suppression structure including a reverse acting bladder comprising at least one layer of elastomeric material formed into a substantially tubular structure having the shape of a bellows, the substantially tubular structure having closed ends and configured to longitudinally elongate and to reduce a diameter thereof upon internal pressurization and to longitudinally shorten and increase the diameter responsive to a reduction in internal pressure;

a structure for lowering and raising the reverse acting bladder within the borehole; and a gas source for supplying gas to pressurize the reverse acting bladder.

38. The apparatus according to claim 37, wherein the substantially tubular structure with closed ends is formed of a plurality of layers of elastomeric material.

39. The apparatus according to claim 37, wherein the elastomeric material comprises natural or synthetic rubber.

40. The apparatus according to claim 37, wherein the structure for lowering and raising the reverse acting bladder within the borehole is a wireline or a tubing string.

41. The apparatus according to claim 37, wherein the gas source is a self-contained gas source associated with the apparatus.

42. The apparatus according to claim 37, wherein the gas is helium or nitrogen.

43. The apparatus according to claim 37, further comprising: at least one sensor connected to the structure.

44. The apparatus according to claim 37, further comprising:

a pump operably coupled to the reverse acting bladder and configured for removing gas from an interior thereof.

45. A method of suppressing wave energy in a borehole comprising:

pressurizing a reverse acting bladder having the shape of a bellows to extend the reverse acting bladder in a longitudinal direction and reduce a diameter thereof;

positioning the reverse acting bladder within a fluid-filled borehole;

reducing pressure within the reverse acting bladder to longitudinally shorten the reverse acting bladder and expand its diameter; and suppressing the transmission of wave energy traveling along the fluid-filled borehole with the reverse acting bladder.

46. The method according to claim 45, wherein positioning the reverse acting bladder within the fluid-filled borehole comprises raising and lowering the reverse acting bladder.

47. The method according to claim 45, wherein pressurizing the reverse acting bladder comprises supplying a gas to an interior of the reverse acting bladder.

48. The method according to claim 47, wherein supplying the gas comprises supplying the gas from a gas source located within the fluid-filled borehole.

49. The method according to claim 47, wherein supplying the gas comprises supplying helium or nitrogen.

50. The method according to claim 45, further comprising positioning at least one sensor within the fluid-filled borehole; and positioning the reverse acting bladder adjacent the at least one sensor.

* * * * *